United States Patent
A et al.

(10) Patent No.: US 10,282,132 B2
(45) Date of Patent: May 7, 2019

(54) METHODS AND SYSTEMS FOR PROCESSING PRP/SGL ENTRIES

(71) Applicant: Samsung Electronics Co., Ltd., Suwon-si, Gyeonggi-do (KR)

(72) Inventors: Dhananjayan A, Bengaluru (IN); Venkataratnam Nimmagadda, Bengaluru (IN); Srinivasa Raju Nadakuditi, Bengaluru (IN); Renuka Vijay Sapkal, Bengaluru (IN)

(73) Assignee: Samsung Electronics Co., Ltd. (KR)

( * ) Notice: Subject to any disclaimer, the term of this patent is extended or adjusted under 35 U.S.C. 154(b) by 102 days.

(21) Appl. No.: 15/495,305

(22) Filed: Apr. 24, 2017

(65) Prior Publication Data
US 2017/0308329 A1    Oct. 26, 2017

(30) Foreign Application Priority Data
Apr. 25, 2016 (IN) .............................. 201641014359

(51) Int. Cl.
*G06F 3/06* (2006.01)
*G06F 13/16* (2006.01)
*G06F 13/42* (2006.01)

(52) U.S. Cl.
CPC ............ *G06F 3/0659* (2013.01); *G06F 3/061* (2013.01); *G06F 3/0656* (2013.01); *G06F 3/0679* (2013.01); *G06F 3/0688* (2013.01); *G06F 13/1673* (2013.01); *G06F 13/4282* (2013.01)

(58) Field of Classification Search
CPC ...... G06F 3/0659; G06F 3/0688; G06F 3/061; G06F 13/1673; G06F 3/0656; G06F 3/0679; G06F 13/4282

USPC ........................................................ 711/102
See application file for complete search history.

(56) References Cited

U.S. PATENT DOCUMENTS

| | | | |
|---|---|---|---|
| 8,713,204 B2 | 4/2014 | Peled | |
| 8,954,657 B1* | 2/2015 | Asnaashari | G06F 12/0246 711/103 |
| 9,122,401 B2 | 9/2015 | Zaltsman et al. | |
| 2006/0294300 A1* | 12/2006 | Lubbers | G06F 3/061 711/113 |
| 2011/0289256 A1* | 11/2011 | Bartlett | G06F 12/0844 711/3 |
| 2014/0229699 A1 | 8/2014 | Gurgi et al. | |
| 2015/0006663 A1* | 1/2015 | Huang | G06F 13/4221 709/213 |

(Continued)

FOREIGN PATENT DOCUMENTS

WO    WO 2014/031387 A1    2/2014

*Primary Examiner* — Hashem Farrokh
(74) *Attorney, Agent, or Firm* — Myers Bigel, P.A.

(57) ABSTRACT

Methods and systems for processing Physical Region Pages (PRP)/Scatter Gather Lists (SGL) entries include splitting a command to be processed into a plurality of sub-commands, storing said plurality of sub-commands in a first set of buffers among a plurality of buffers, processing said plurality of sub-commands from said first set of buffers, storing at least one sub-command that remains after storing the first set of buffers in a second set of buffers, while said plurality of sub-commands in the first set of buffers is being processed and processing said at least one sub-command from said second set of buffers, after processing sub-commands from said first set of buffers.

20 Claims, 2 Drawing Sheets

(56) References Cited

U.S. PATENT DOCUMENTS

2015/0095554 A1* 4/2015 Asnaashari ......... G06F 12/0246
　　　　　　　　　　　　　　　　　　　711/103
2015/0331638 A1 　11/2015 Zaltsman et al.
2015/0356033 A1* 12/2015 Rose ................... G06F 13/1642
　　　　　　　　　　　　　　　　　　　710/310

* cited by examiner

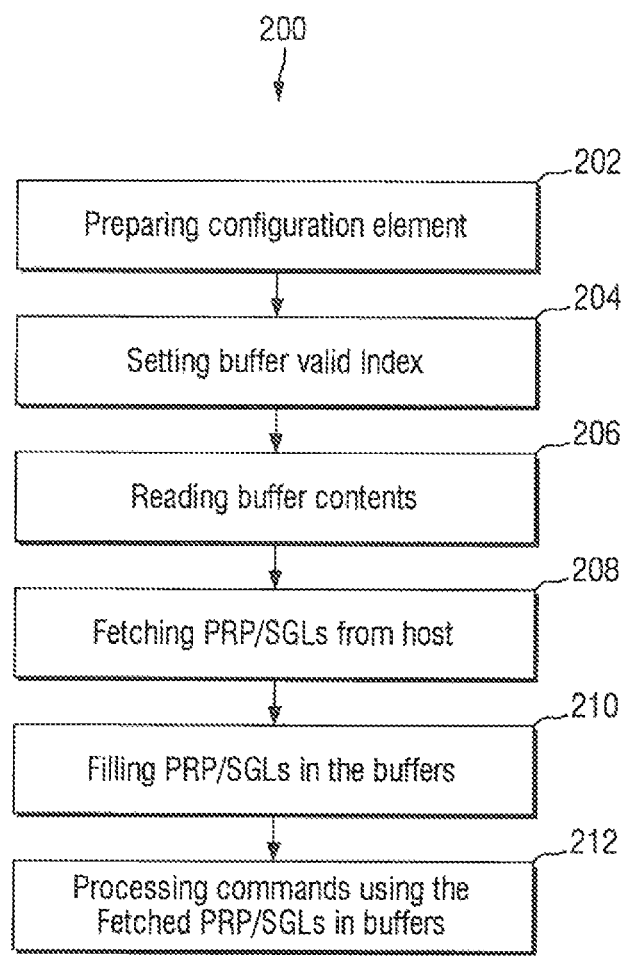

METHODS AND SYSTEMS FOR PROCESSING PRP/SGL ENTRIES

CROSS-REFERENCE TO RELATED APPLICATION

This U.S. non-provisional application claims priority under 35 U.S.C. § 119 to Indian Patent Application No. 201641014359 filed on Apr. 25, 2016, in the Controller General of Patents Designs and Trademarks (CGPDT), the entire content of which is incorporated by reference herein.

BACKGROUND

1. Field

The embodiments herein relate to communication interfaces and, more particularly, communication interfaces related to Physical Region Page (PRP)/Scatter Gather List (SGL) fetching and processing in Solid State Drives implementing the Non-Volatile Memory Express (NVMe) Storage protocol.

2. Description of the Related Art

A Solid State Drive (SSD) is an Integrated Circuit (IC) based storage mechanism which can store data persistently. SSDs are capable of providing higher bandwidth and lower latency compared to hard drives. While SSD can offer great speed and performance, the traditional buses such as Peripheral Component Interface (PCI), Serial Advanced Technology Attachment (SATA), Serial Attached Small Computer System Interface (SAS) and so on that connect the SSD to other devices may have limitations in terms of speed and data transfer capacity. As a result, the actual capability of an SSD may go unused.

NVMe can act as a logical device interface to access SSDs using a PCI Express bus. NVMe was introduced, in part, to respond to speed and performance related issues which occur with SSDs. NVMe allows parallelism, thereby allowing efficient utilization of the SSD capability and host software, which may in turn improve overall performance.

NVMe protocol defines commands that utilize Physical Region Pages (PRP)/Scatter Gather Lists (SGL) to denote a data buffer location in host memory. The data buffer may be represented using single or multiple PRP/SGL entries similar to a linked list. Associated information for a command including PRP/SGL may be formed before the command is issued to the SSD for execution. The SSD, while executing the command, may fetch the associated PRP/SGL and perform data movement related to the command.

The NVMe protocol is described in the NVMe specification, such as version 1.2.1 of the NVMe specification available at www.nvmexpress.org.

SUMMARY

Example embodiments of the present inventive concepts may provide methods for enabling NVMe systems for fetching of PRP/SGL for efficient processing of commands, irrespective of the size of commands.

Example embodiments of the present inventive concepts may provide NVMe systems to perform out-of-order command execution.

In accordance with an aspect of the present inventive concepts, a method for processing Physical Region Page (PRP)/Scatter Gather List (SGL) entries includes splitting a command to be processed into a plurality of sub-commands, storing a first subset of the plurality of sub-commands in a first set of buffers among a plurality of buffers, processing a portion of the first subset of the plurality of sub-commands from the first set of buffers, storing a second subset of the plurality of sub-commands in a second set of buffers among the plurality of buffers, while the first subset of the plurality of sub-commands in the first set of buffers is being processed, and processing the second subset of the plurality of sub-commands from the second set of buffers, after processing the portion of the first subset of the plurality of sub-commands from the first set of buffers.

In accordance with another aspect of the present inventive concepts, a system for processing Physical Region Page (PRP)/Scatter Gather List (SGL) entries includes a hardware processor, a non-volatile memory comprising instructions, said instructions configured to cause said hardware processor to split a command to be processed into a plurality of sub-commands, store a first subset of the plurality of sub-commands in a first set of buffers among a plurality of buffers, process a portion of the first subset of the plurality of sub-commands from the first set of buffers, store a second subset of the plurality of sub-commands in a second set of buffers among the plurality of buffers, while the first subset of the plurality of sub-commands in the first set of buffers is being processed, and process the second subset of the plurality of sub-commands from the second set of buffers, after processing the portion of the first subset of the plurality of sub-commands from the first set of buffers.

In accordance with another aspect of the present inventive concepts, a computer program product includes splitting a command to be processed into a plurality of sub-commands, storing a first subset of the plurality of sub-commands in a first set of buffers among a plurality of buffers, processing a portion of the first subset of the plurality of sub-commands from the first set of buffers, storing a second subset of the plurality of sub-commands in a second set of buffers among the plurality of buffers, while the first subset of the plurality of sub-commands in the first set of buffers is being processed, and processing the second subset of the plurality of sub-commands from the second set of buffers, after processing the portion of the first subset of the plurality of sub-commands from the first set of buffers.

BRIEF DESCRIPTION OF THE DRAWINGS

The above and other aspects and features of the present inventive concepts will become more apparent by describing in detail example embodiments thereof with reference to the attached drawings, in which:

FIG. 2 is a flow diagram that depicts steps involved in fetching PRP/SGL data structures for executing commands and also to support out-of-order command execution by the command processing system, according to embodiments of the present inventive concepts.

DETAILED DESCRIPTION

Figure 1:
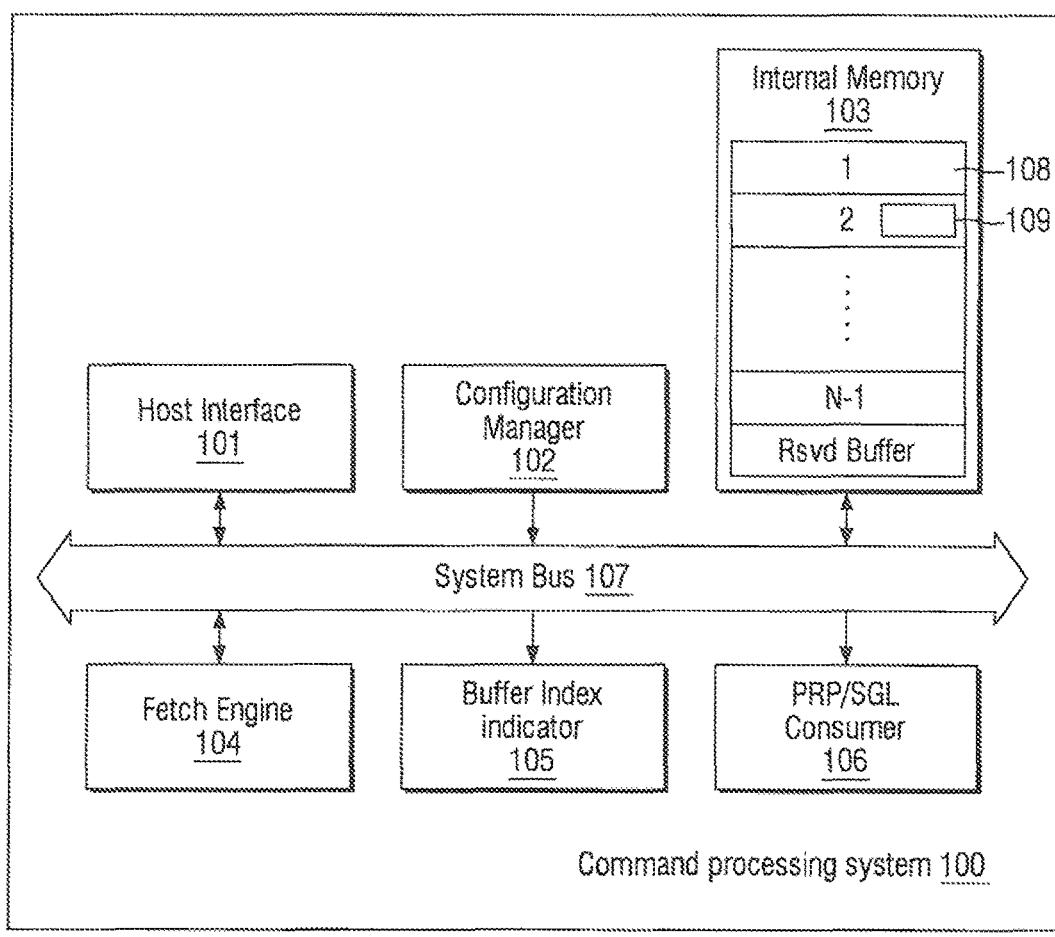
FIG. 1 illustrates a block diagram of a command processing system according to embodiments of the present inventive concepts.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods and systems for fetching the PRP/SGL entries for executing commands, and also for supporting out-of-order command execution in an NVMe based memory system. Referring now to the drawings, and more particularly to FIGS. 1 through 2, where similar reference characters denote corresponding features consistently throughout the figures, embodiments of the present inventive concepts are shown.

FIG. 1 illustrates a block diagram of a command processing system 100 according to embodiments of the present inventive concepts. The command processing system 100 may include a host interface 101, a configuration manager 102, an internal memory 103, a fetch engine 104, a buffer index indicator 105, a PRP/SGL consumer 106, and a system bus 107.

The host interface 101 can be configured to provide at least one option for the command processing system 100 to connect to a host, from which at least one command may be collected for processing. The host may provide one or more commands pertaining to data and memory management. The configuration manager 102 can be configured to split a command, such as an NVMe command, received from the host into a plurality of sub-commands. The sub-commands can be populated into different buffers 108 of the internal memory 103. The configuration manager 102 may store a configuration element 109 in the internal memory 103 based on information present in the command (e.g., the NVMe command) and set a buffer index value as valid to indicate that a buffer 108 has been populated, and to mark the point up to which the buffer 108 has been populated. In some embodiments, the buffer index value may be maintained by the buffer index indicator 105. Configuration manager 102 can be further configured to write PRP/SGL entries to be used for the NVMe command, if and when needed.

The internal memory 103 can be configured to store a PRP/SGL entry fetched from the host for further processing. The internal memory 103 can be further configured to provide at least one interface to access and fetch the data associated with the PRP/SGL entry during a processing stage. In some embodiments, the internal memory 103 may be divided into a plurality of buffers 108 that can be used to store the data associated with the PRP/SGL entries, where each buffer 108 is indexed for faster access. The internal memory 103, or an interface associated with the internal memory 103, can be configured to permit filling of the buffers 108 of the internal memory 103 in an alternate order. The internal memory 103 can be further configured to support fetching and execution of data from random buffers 108. In some embodiments, the internal memory 103 may contain a reserved buffer Rsvd_Buffer which may be used to store fetched data associated with a PRP/SGL entry.

The fetch engine 104 can be configured to fetch PRP/SGL entries from the host via the host interface 101 and populate corresponding buffers 108 in the internal memory 103. The fetch engine 104 can be further configured to check, upon triggering, whether additional PRP/SGL entries are required or not, and fetch the additional PRP/SGL entries from the host if additional PRP/SGL entries are required. The fetch engine 104 can be further configured to write the fetched PRP/SGL entries to the corresponding buffer 108, along with corresponding configuration elements 109, and then to set the buffer index value corresponding to the written buffer 108 after writing to the buffer 108. In some embodiments, the fetch engine 104 may set different values for the buffer index value at different instances of fetching and writing. The fetch engine 104 can be further configured to switch from one command to another, before completing the PRP/SGL fetch of the command that is currently being executed. The fetch engine 104 can be further configured to set the buffer index value within a buffer index valid register, which indicates whether the contents of the buffer 108 are valid or not. The buffer index value may be the bit position corresponding to the buffer 108 within the buffer index valid register.

The buffer index indicator 105 may indicate the buffer index valid register, which may indicate valid buffers 108 for processing by the PRP/SGL consumer 106. This buffer index indicator 105 may also indicate the position within the buffers 108 which PRP/SGL consumer 106 has processed. This buffer index indicator 105 may also indicate the position within the buffers 108 from which the PRP/SGL consumer 106 can be resumed. In some embodiments, the buffer index indicator 105 may contain a plurality of bits corresponding to respective ones of the buffers 108 which can be set or cleared depending on the validity of the data within the corresponding buffer 108.

The PRP/SGL consumer 106 can be configured to check, upon triggering, whether a buffer index value is set within the buffer index indicator 105 or not. The PRP/SGL consumer 106 can be further configured to start consuming buffers 108 from the internal memory 103, if the buffer index value has been set within the buffer index indicator 105. The PRP/SGL consumer 106 can be further configured to trigger the fetch engine 103, after consuming buffers 108 from the internal memory 103. After the PRP/SGL consumer 106 consumes a respective buffer 108 from the internal memory 103, the PRP/SGL consumer may clear the corresponding buffer index value for the consumed buffer 108 within the buffer index indicator 105.

The system bus 107 is configured to provide suitable interfaces for the other components of the command processing system 100 to connect with each other, and transfer control signals and data signals associated with different functions of the command processing system 100. The system bus 107 can be further configured to provide necessary bandwidth to support the aforementioned control as well as data flow.

FIG. 2 is a flow diagram that depicts steps involved in the process of fetching PRP/SGL entries, by the command processing system 100, according to embodiments of the present inventive concepts. Initially, a configuration element 109 may be prepared (202) by the configuration manager 102. The configuration element 109 may include information such as, but not limited to, host addresses for fetching PRP/SGL entries fetching, and a total PRP/SGL segment length, for the command being processed and/or executed. The configuration manager 102 may further set (204) a value of a buffer index value within the buffer index indicator 105. In some embodiments, the buffer index value within the buffer index indicator 105 may represent that the corresponding buffer 108 contains a valid PRP/SGL entry for processing.

After setting the buffer index value, the configuration manger 102 may trigger the PRP/SGL consumer 106 with the set buffer index value included in the buffer index indicator 105. Upon identifying the buffer 108 indicated by the buffer index value, the PRP/SGL consumer 106 reads (206) contents of the identified buffer 108. In some embodiments, the PRP/SGL consumer 106 may read the configuration element 109 from the buffer 108.

After reading the contents from the buffer 108, the PRP/SGL consumer 106 may trigger the fetch engine 104, with the configuration element 109 as read from the buffer 108. The configuration element 109 may include information such as, but not limited to, host addresses for PRP/SGL entries, and a total PRP/SGL segment length. Based on this information, the fetch engine 104 may fetch (208) PRP/SGL entries from the host.

Further, the fetch engine 104 may write (210) the fetched PRP/SGL data into a buffer 108 of the memory 103. In some embodiments, the buffers 108 may be populated in an alternate manner such that when a first set of buffers 108 get filled, the second set of buffers 108, i.e. one of the remaining buffers 108, get processed, and vice versa. In some embodiments, the fetch engine 104 may write the fetched PRP/SGL data into a first buffer 108 of the memory 103 that is different from a second buffer 108 which contains the command which triggered the fetch 104. While populating the buffers 108, the fetch engine 104 may also prepare a configuration element 109 which contains details required for fetching PRP/SGL data in the next iteration. After this, the buffer index value may be set within the buffer index indicator 105 by the fetch engine 104, to indicate the next set of buffers 108 to be used in the next iteration.

The various actions in method 200 may be performed in the order presented, in a different order or simultaneously. Further, in some embodiments, some actions listed in FIG. 2 may be omitted.

The embodiments disclosed herein specify a mechanism for fetching and processing of PRP/SGL data structures in NVMe based systems. The methods allow out-of-order command execution, and provide a system according to the methods. It is to be noted that same or similar methods can be used for command fetching in systems that support other protocols such as, but not limited to, Small Computer System Interface express (SCSIe) as well. Therefore, it is understood that the scope of protection is extended to such a system and by extension, to a computer readable means having a message therein. The computer readable means may contain a program code for implementation of one or more steps of the method, when the program runs on a server or mobile device or any suitable programmable device. The methods may be implemented in a preferred embodiment using the system together with a software program written in, for example, Very high speed integrated circuit Hardware Description Language (VHDL), another programming language, or implemented by one or more VHDL or several software modules being executed on at least one hardware device. The hardware device can be any kind of device which can be programmed including, for example, any kind of a computer, such as a server or a personal computer, or the like, or any combination thereof, for example, one processor and two FPGAs. The device may also include, for example, hardware such as an ASIC or a combination of hardware and software, such as an ASIC and an FPGA, or at least one microprocessor and at least one memory with software modules located therein. The method embodiments described herein could be implemented in pure hardware, pure software, or partly in hardware and partly in software. In some embodiments, the embodiment may be implemented on different hardware devices, for example, using a plurality of CPUs.

The foregoing description of the embodiments will so fully reveal the general nature of the embodiments herein that others can, by applying current knowledge, readily modify and/or adapt for various applications such specific embodiments without departing from the inventive concepts, and, therefore, such adaptations and modifications should, and are intended to, be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the spirit and scope of the claims as described herein.

What is claimed is:

1. A method for processing Physical Region Page (PRP)/Scatter Gather List (SGL) entries comprising:
   splitting a command to be processed into a plurality of sub-commands;
   storing a first subset of the plurality of sub-commands in a first set of buffers among a plurality of buffers;
   processing a portion of the first subset of the plurality of sub-commands from the first set of buffers;
   storing a second subset of the plurality of sub-commands in a second set of buffers among the plurality of buffers, while the first subset of the plurality of sub-commands in the first set of buffers is being processed; and
   processing the second subset of the plurality of sub-commands from the second set of buffers, after processing the portion of the first subset of the plurality of sub-commands from the first set of buffers.

2. The method of claim 1, further comprising:
   responsive to storing the first subset of the plurality of sub-commands in the first set of buffers among the plurality of buffers, setting a first buffer index indicator that indicates that the first set of buffers among the plurality of buffers includes valid data for processing, wherein the first buffer index indicator is one of a plurality of buffer index indicators, respective ones of the plurality of buffer index indicators corresponding to ones of the plurality of buffers.

3. The method of claim 2, wherein processing the portion of the first subset of the plurality of sub-commands from the first set of buffers is performed responsive to detection that the first buffer index indicator corresponding to the first set of buffers has been set.

4. The method of claim 3, further comprising:
   responsive to processing the second subset of the plurality of sub-commands from the second set of buffers, clearing a second buffer index indicator among the plurality of buffer index indicators that indicates that the second set of buffers among the plurality of buffers no longer includes valid data for processing.

5. The method of claim 1, further comprising:
   storing a configuration element in the first set of buffers that indicates a current status of the processing of the portion of the first subset of the plurality of sub-commands; and
   updating the configuration element in the first set of buffers after processing the portion of the first subset of the plurality of sub-commands.

6. The method of claim 1, wherein the command to be processed is a first command,
   wherein the plurality of sub-commands is a first plurality of sub-commands, and further comprising:
   receiving a second command to be processed;
   splitting the second command to be processed into a second plurality of sub-commands;
   storing a third subset of the second plurality of sub-commands in a third set of buffers among the plurality of buffers; and processing a portion of the third subset of the second plurality of sub-commands from the third set of buffers after processing the portion of the first subset of the first plurality of sub-commands from the first set of buffers and before processing the second subset of the first plurality of sub-commands from the second set of buffers.

7. The method of claim 1, wherein processing the portion of the first subset of the plurality of sub-commands from the first set of buffers comprises storing data associated with the portion of the first subset of the plurality of sub-commands in at least one third buffer of the plurality of buffers that is different from the first set of buffers.

8. A system for processing Physical Region Page (PRP)/Scatter Gather List (SGL) entries comprising:
a processor;
a non-transitory memory comprising instructions, the instructions configured to cause the processor to:
split a command to be processed into a plurality of sub-commands;
store a first subset of the plurality of sub-commands in a first set of buffers among a plurality of buffers;
process a portion of the first subset of the plurality of sub-commands from the first set of buffers;
store a second subset of the plurality of sub-commands in a second set of buffers among the plurality of buffers, while the first subset of the plurality of sub-commands in the first set of buffers is being processed; and
process the second subset of the plurality of sub-commands from the second set of buffers, after processing the portion of the first subset of the plurality of sub-commands from the first set of buffers.

9. The system of claim 8, wherein the instructions are further configured to cause the processor to:
responsive to storing the first subset of the plurality of sub-commands in the first set of buffers among the plurality of buffers, set a first buffer index indicator that indicates that the first set of buffers among the plurality of buffers includes valid data for processing,
wherein the first buffer index indicator is one of a plurality of buffer index indicators, respective ones of the plurality of buffer index indicators corresponding to ones of the plurality of buffers.

10. The system of claim 9, wherein processing the portion of the first subset of the plurality of sub-commands from the first set of buffers is performed responsive to detection that the first buffer index indicator corresponding to the first set of buffers has been set.

11. The system of claim 10, wherein the instructions are further configured to cause the processor to:
responsive to processing the second subset of the plurality of sub-commands from the second set of buffers, clear a second buffer index indicator among the plurality of buffer index indicators that indicates that the second set of buffers among the plurality of buffers no longer includes valid data for processing.

12. The system of claim 8, further wherein the instructions are further configured to cause the processor to:
store a configuration element in the first set of buffers that indicates a current status of the processing of the first subset of the plurality of sub-commands; and
update the configuration element in the first set of buffers after processing the portion of the first subset of the plurality of sub-commands.

13. The system of claim 8, wherein the command to be processed is a first command,
wherein the plurality of sub-commands is a first plurality of sub-commands, and
wherein the instructions are further configured to cause the processor to:
receive a second command to be processed;
split the second command to be processed into a second plurality of sub-commands;
store a third subset of the second plurality of sub-commands in a third set of buffers among the plurality of buffers; and
process a portion of the third subset of the second plurality of sub-commands from the third set of buffers after processing the portion of the first subset of the first plurality of sub-commands from the first set of buffers and before processing the second subset of the plurality of sub-commands from the second set of buffers.

14. The system of claim 8, wherein processing the portion of the first subset of the plurality of sub-commands from the first set of buffers comprises storing data associated with the portion of the first subset of the plurality of sub-commands in at least one third buffer of the plurality of buffers that is different from the first set of buffers.

15. A computer program product comprising:
a tangible non-transitory computer readable storage medium comprising computer readable program code embodied in the medium that when executed by at least one processor causes the at least one processor to perform operations comprising:
splitting a command to be processed into a plurality of sub-commands;
storing a first subset of the plurality of sub-commands in a first set of buffers among a plurality of buffers;
processing a portion of the first subset of the plurality of sub-commands from the first set of buffers;
storing a second subset of the plurality of sub-commands in a second set of buffers among the plurality of buffers, while the first subset of the plurality of sub-commands in the first set of buffers is being processed; and
processing the second subset of the plurality of sub-commands from the second set of buffers, after processing the portion of the first subset of the plurality of sub-commands from the first set of buffers.

16. The computer program product of claim 15, wherein the operations further comprise:
responsive to storing the first subset of the plurality of sub-commands in the first set of buffers among the plurality of buffers, setting a first buffer index indicator that indicates that the first set of buffers among the plurality of buffers includes valid data for processing,
wherein the first buffer index indicator is one of a plurality of buffer index indicators, respective ones of the plurality of buffer index indicators corresponding to ones of the plurality of buffers.

17. The computer program product of claim 16, wherein processing the portion of the first subset of the plurality of sub-commands from the first set of buffers is performed responsive to detection that the first buffer index indicator corresponding to the first set of buffers has been set.

18. The computer program product of claim 17, wherein the operations further comprise:
responsive to processing the second subset of the plurality of sub-commands from the second set of buffers, clearing a second buffer index indicator among the plurality of buffer index indicators that indicates that the second set of buffers among the plurality of buffers no longer includes valid data for processing.

19. The computer program product of claim 15, wherein the operations further comprise:
- storing a configuration element in the first set of buffers that indicates a current status of the processing of the first subset of the plurality of sub-commands; and
- updating the configuration element in the first set of buffers after processing the portion of the first subset of the plurality of sub-commands.

20. The computer program product of claim 15, wherein the command to be processed is a first command, wherein the plurality of sub-commands is a first plurality of sub-commands, and further comprising:
- receiving a second command to be processed;
- splitting the second command to be processed into a second plurality of sub-commands;
- storing a third subset of the second plurality of sub-commands in a third set of buffers among the plurality of buffers; and
- processing a portion of the third subset of the second plurality of sub-commands from the third set of buffers after processing the portion of the first subset of the first plurality of sub-commands from the first set of buffers and before processing the second subset of the first plurality of sub-commands from the second set of buffers.

* * * * *